United States Patent
Carpenter et al.

[11] 3,713,395
[45] Jan. 30, 1973

[54] SOLID PROPELLANT
[75] Inventors: David W. Carpenter, China Lake; Jack A. Yeakey, Ridgecrest, both of Calif.
[73] Assignee: The United States of America as represented by the Secretary of the Navy
[22] Filed: April 28, 1971
[21] Appl. No.: 138,022

[52] U.S. Cl.................................102/103, 60/255
[51] Int. Cl..............................................F42b 1/00
[58] Field of Search............102/103; 60/35.6 RS, 255

[56] References Cited
UNITED STATES PATENTS 2,994,359  8/1961  Westbrook et al. ............102/103 X
2,917,424  12/1959  Hirsch et al. ..................102/103 X Primary Examiner—Robert F. Stahl
Attorney—R. S. Sciascia, Roy Miller and Gerald F. Maker

[57] ABSTRACT

The propellant grain of a rocket motor is improved by providing flame resistant adhesive strips longitudinally on the outer periphery of the grain for centering the grain in the motor case and to allow for equal distribution of chamber pressure around the exterior of the grain. The results are also enhanced by addition of a slotted pressurization ring at the forward end of the grain.

1 Claim, 1 Drawing Figure

PATENTED JAN 30 1973  3,713,395
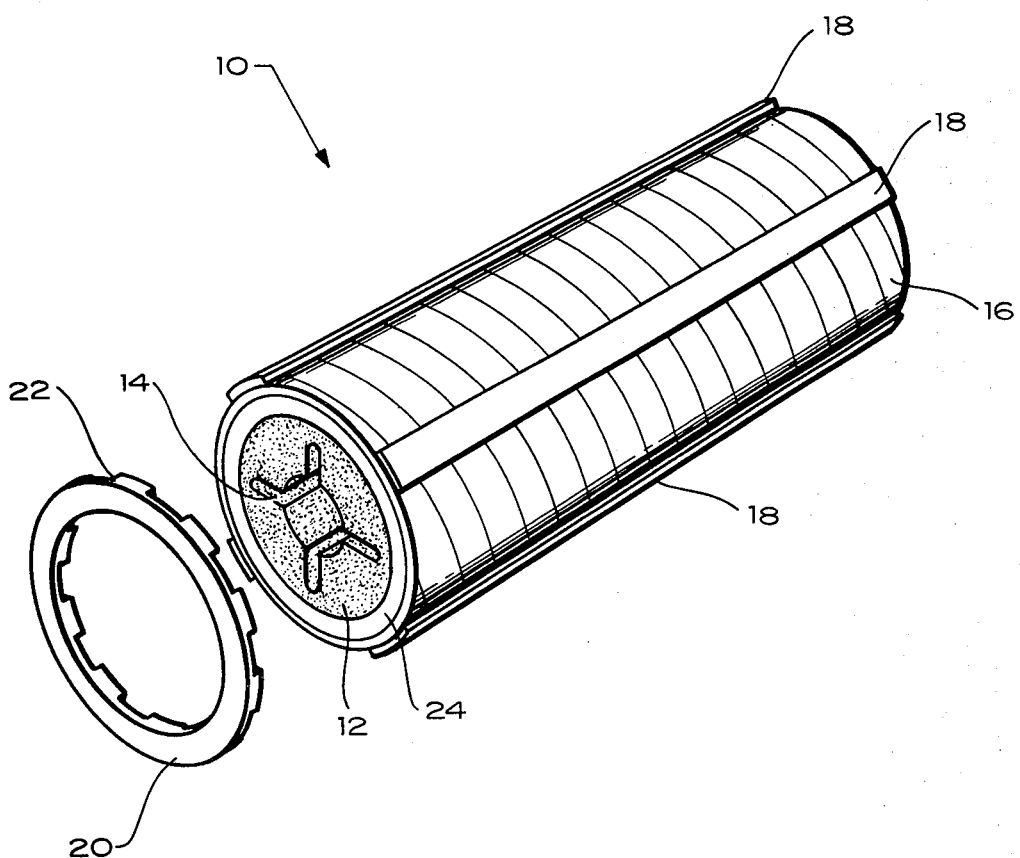
INVENTORS
DAVID W. CARPENTER
JACK A. YEAKEY
BY: ROY MILLER
    ATTORNEY.
    GERALD F. BAKER
    AGENT.

SOLID PROPELLANT

BACKGROUND OF THE INVENTION

Previous attempts to center a propellant grain in a motor case have involved resilient or flexible curved strips, for example, providing positive radial support during transport and operation and the strips were generally fashioned from ductile plastic or other elastic materials which were subject to permanent deformation during handling and operation.

According to the present invention, the strips which provide for centering, radial support, etc., are identical or similar to an inhibiter tape which is spirally wound on the outer surface of the grain. The use of these adhesive strips in conjunction with an end pressurization ring provides a positively pressurized and controlled annular area which provides additional grain support in flight as well as during transport and has been found to be less likely to shift or become unfastened during operation. Since these strips may be permanently positioned with respect to the grain, this also provides a means of directing grain stresses over thin web sections of the propellant.

BRIEF DESCRIPTION OF THE DRAWING

The FIG. on the drawing is an exploded perspective view of a propellant grain assembly according to the invention.

DESCRIPTION OF A PREFERRED EMBODIMENT OF THE INVENTION

Shown at 10 on the drawing is an embodiment of a propellant grain assembly according to the invention which is designed to be cartridge loaded into a cylindrical rocket motor, for example. As shown, the propellant grain 12 is formed with a conventional star shaped inner bore 14 and is spirally wrapped with a number of layers of inhibitor tape 16. Any flexible and pliable adhesive strip of flame resistant material may be used.

In the embodiment shown there are four equally spaced flame resistant adhesives strips 18 fastened longitudinally of the finished grain. The adhesive strips 18 may be of the same material as the wrapping material 16 or they may be manufactured of other flame resistant material. The thickness of the strips 18 may be varied in original manufacture or may be built up using a plurality of strips at installation.

With the use of centering strips, it has been found advantageous to equalize the pressure surrounding the propellant grain between strips with the pressure within the inner bore. For this purpose, a pressurization ring 20 having slots or notches 22, has been shown positioned forward of the grain to provide communication between the inner bore and the outer periphery of the grain so that motor gases may circulate.

Inhibitor rings are generally placed fore and aft on the propellant grain and pressurization ring 20 may be of inhibitor material and replace the usual forward inhibitor ring 24.

What is claimed is:

1. A solid propellant assembly for cartridge loading in a substantially cylindrical motor tube comprising:
    a propellant grain having a central bore and a substantially cylindrical outer surface;
    said outer surface of said grain being covered with a flexible, pliable flame resistant material;
    three or more flexible and pliable flame resistant strips adhesively fixed to said outer surface;
    said strips being fixed longitudinally of said grain with substantially equal spacing between strips;
    an inhibitor ring fastened endwise on said grain and having notches therein facing said grain to provide communicating passages between said central bore and said outer surface of said grain.

* * * * *